United States Patent Office 3,592,831
Patented July 13, 1971

3,592,831
NITRATOMETHYL-SILICON COMPOUNDS
Sandor Barcza, West Orange, N.J., assignor to
Sandoz-Wander, Inc., Hanover, N.J.
No Drawing. Filed Sept. 23, 1968, Ser. No. 761,800
Int. Cl. C07f 7/10
U.S. Cl. 260—448.2N                13 Claims

ABSTRACT OF THE DISCLOSURE

The compounds are silanes and disiloxanes having at least one nitratomethyl group, e.g., hexakis-nitratomethyl disiloxane. The compounds are useful pharmaceutically, and as explosives and are prepared by reacting an appropriate halomethyl-substituted silane or disiloxane with metallic nitrate, e.g., siver nitrate.

This invention relates to nitratomethyl-silicon compounds and more particularly to nitratomethyl-silicon compounds of the formula I

(I)

wherein
B is —$CH_2$—$ONO_2$, lower alkyl, or —CH=CH—$R^1$ wherein $R^1$ is a hydrogen atom or lower alkyl;
Y is —$CH_2$—$ONO_2$, lower alkyl, or —CH=CHH—$R^2$ wherein $R^2$ is a hydrogen atom or lower alkyl;
Z is lower alkyl or —$CH_2$—$ONO_2$; and
A is —$CH_2$—$ONO_2$ or

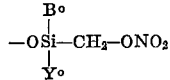

wherein
B° is —$CH_2$—$ONO_2$, lower alkyl, or

—CH=CH—$R^3$ wherein $R^3$ is a hydrogen atom or lower alkyl; and
Y° is —$CH_2$—$ONO_2$, lower alkyl, or

—CH=CH—$R^4$ wherein $R^4$ is a hydrogen atom or lower alkyl.

The nitratomethyl-silicon compounds (I) are prepared by contacting a compound of the Formula II, i.e. a halomethyl-silicon compound corresponding to compound I, with a metallic nitrate. Cmpounds II have the formula

(II)

wherein
B' is —$CH_2$—X, lower alkyl, or —CH=CH—$R^1$;
Y' is —$CH_2$—X, lower alkyl, or —CH=CH—$R^2$;
Z' is lower alkyl or —$CH_2$—X; and
A' is —$CH_2$—X or

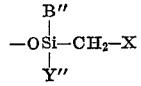

wherein
B" is —$CH_2$—X, lower alkyl, or —CH=CH—$R^3$; and
Y" is —$CH_2$—X, lower alkyl, or —CH=CH—$R^4$;

$R^1$, $R^2$, $R^3$ and $R^4$ being as defined above, and X signifying a halogen atom having an atomic weight of 35 to 127, i.e. chloro, bromo or iodo.

The term "lower alkyl" in the above definitions of compounds I and II signifies a saturated aliphatic moiety, e.g., having from 1 to 4 carbon atoms, such as methyl, ethyl, n-propyl, isopropyl, isobutyl, n-butyl, sec-butyl, or t-butyl, preferably a saturated aliphatic moiety which is free of α-branching, such as methyl, ethyl, n-propyl, n-butyl or isobutyl. The reaction is preferably carried out in an inert organic medium which is a solvent for at least one of the reactants, e.g., acetonitrile or dimethylacetamide. It is preferred to carry out the reaction under substantially anhydrous conditions. The reactants are preferably admixed in the cold, e.g., at from —5° to +10° C. and the reaction mixture then allowed to warm, e.g., to room temperature (25° C.). It is preferred to employ the metallic nitrate in slight excess, e.g., 10% over that theoretically required for the reaction. A preferred metallic nitrate is one which is soluble in anhydrous organic solvents and forms halide salts which are relatively insoluble in either water or organic solvents, e.g., silver nitrate. When silver nitrate is employed as the metallic nitrate the reaction is preferably carried out in the dark and without the application of external heat.

Compounds II are either known and are obtainable as described in the literature, or where not known, they may be prepared by methods analogous to those described for preparing known compounds. A convenient method for preparing a compound IIa, i.e. a compound II wherein X is iodo is to mix a solution of sodium iodide in acetone with an acetone solution of an appropriate compound IIb i.e. a compound II wherein X is either bromo or chloro, and to reflux the resulting mixture. Reaction is indicated by the precipitation of sodium bromide or chloride, which is filtered off and the resultant iodo compound (IIa) recovered from the filtrate. Faster conversion to the iodo analogue occurs where the bromo analogue is used as compound IIb.

The compounds I are readily detonated by heating and are useful as explosives. Accordingly, the usual precautions exercised in handling explosive materials should be observed in handling compounds I. For example, in recovering compounds I from reaction mixtures, heating should be avoided, e.g., solvent stripping may be accomplished by the use of vacuum distillation and cooling the still pot in a water bath held at below 25° C. Compounds I are conveniently stored and measured in solutions of inert solvent, e.g., dimethylacetamide, to avoid detonation of the pure compound by shock or flame etc.

The compounds I of the invention are also useful pharmaceutically, i.e. as coronary dilators, as indicated on intravenous administration to the anesthetized dog and measurement of blood flow through the anterior descending branch of the left coronary artery (1–15 mg./kg. dosage). For such use, the compounds may be combined with a pharmaceutically acceptable carrier, and such other conventional adjuvants as may be necessary, and administered orally in such forms as are conventionally used in administering the well known nitrate dilators, such as nitroglycerin, or parenterally in the form of an injectable solution or suspension. For the above-mentioned use, the dosage administered will, of course, vary depending upon the compounds used, the therapy desired and the mode of administration. However, in general, satisfactory results are obtained when administered at a daily dosage of from about 0.2 milligram to about 15milligrams per kilogram of body weight, preferably given in divided doses 2 to 4 times a day, or in sustained release form. For most mammals the administration of from about 10 milligrams to about 100 milligrams of the compound per day provides satisfactory results and dosage forms suitable for internal administration comprise from about 2.5 milligrams to about 50 milligrams of the compound as the active ingredient. In preparing and administering pharmaceutical compositions containing compounds I, precautions should be observed as are conventionally exercised in handling the well known nitrate dilators which are explosive.

Examples illustrative of this invention are given below. In the examples all temperatures are centigrade, and room temperature is 25° C., unless specifically indicated otherwise.

EXAMPLE 1

Trimethyl-nitratomethyl silane

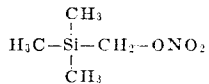

A solution is prepared from 8.5 g. (50 mmoles) of silver nitrate and 10 ml. of anhydrous acetonitrile and the solution cooled in a water bath at room temperature. A solution is prepared from 50 mmoles of trimethyl-iodomethyl silane and 42.5 ml. of anhydrous acetonitrile. The second solution is added to the first solution with stirring and water bath cooling over a period of five minutes. The resultant mixture is stirred for an additional 10 minutes and then allowed to stand in the dark at room temperature for 7 days. The mixture is then filtered. The resultant filter cake is washed with pentane, the wash combined with the filtrate and the combined liquid phase is then shaken with a charge of 200 ml. of water and 70 ml. of pentane. The aqueous phase is separated and washed twice with 30 ml. portions of pentane, which pentane washes are then combined with the organic phase, which combination is then washed twice with 50 ml. portions of water, dried with anhydrous calcium chloride and the solvent removed by distilling under vacuum without heating to yield trimethyl-nitratomethyl silane as a nonviscous oil.

A sample of the title product placed in a glass capillary tube detonates when moved into a flame.

The title product may be obtained by carrying out the abovedescribed process, but replacing the trimethyl-iodomethyl silane with an equivalent amount of trimethyl-chloromethyl silane, however, the reaction is slower and the product more difficult to recover from the reaction mixture.

EXAMPLE 2

Dimethyl-vinyl-nitratomethyl silane

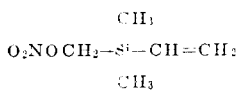

Step A: Dimethyl-vinyl-iodomethyl silane.—A mixture of 13.47 g. (0.1 mole) of dimethyl-vinyl-chloromethyl silane and 25 ml. acetone is prepared and combined with a solution of 20 g. (0.125 mole) of sodium iodide in 75 ml. of acetone. The resulting mixture is refluxed for 18 hours, reaction mixture is then cooled to 0° C., solids are filtered off, the filter cake washed with acetone, and the acetone wash combined with the filtrate. The combined liquid phases are concentrated and then distilled under mild vacuum (collected at 128° to 132° C.) to obtain dimethyl-vinyl-iodomethyl silane as a colorless oil, for use in Step B below.

Step B: Dimethyl-vinyl-nitratomethyl silane.—A solution of 340 mg. (2 mmoles) of silver nitrate and 1 ml. of anhydrous acetonitrile is prepared and cooled to 0° C. A solution of 552 mg. of dimethyl-vinyl-iodomethyl silane and 1 ml. of anhydrous acetonitrile is prepared, and added to the silver nitrate solution, with stirring while cooling in an ice bath. The bath is allowed to rise to room temperature while the resultant mixture is allowed to stand in the dark for 18 hours with stirring. 50 ml. of water and 50 ml. of pentane is then added to the mixture. The mixture is shaken, the organic phase recovered, the aqueous phase extracted twice with 10 ml. portions of pentane, the extracts combined with the organic phase, which combined organic phase is then washed twice with 10 ml. portions of water, filtered through a plug of cotton and concentrated under vacuum in a cold bath at 10° to 20° C. to obtain dimethyl-vinyl-nitratomethyl silane as a colorless oil.

On heating, the title product explodes.

A dimethylacetamide solution of dimethyl-vinyl-nitratomethyl silane may be obtained by the following procedure:

A solution of 3.72 mmoles of the dimethyl-vinyl-iodomethyl silane in 2 ml. of anhydrous dimethylacetamide at 0° C. is mixed with a cold solution of 3.72 mmoles of silver nitrate in 2 ml. of anhydrous dimethylacetamide, with stirring. After 10 minutes of further stirring in the cold, the mixture is allowed to stand in the dark for 60 hours, at room temperature, solids (silver iodide) are filtered off to obtain a dimethylacetamide solution of dimethyl-vinyl-nitratomethyl silane, the concentration of which may be adjusted by the addition of dimethylacetamide washes.

EXAMPLE 3

1,1,3,3-tetramethyl-1,3-bis-nitratomethyl-disiloxane

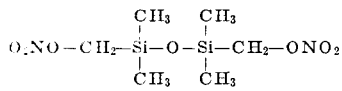

A solution of 12 g. of 1,1,3,3-tetramethyl-1,3-bis-iodomethyl-disiloxane and 15 ml. of anhydrous acetonitrile is prepared. The solution is slowly added to a stirred solution of 12 g. of silver nitrate in 30 ml. of anhydrous acetonitrile, with water bath cooling. The vessel which held the disiloxane compound solution is rinsed with 15 ml. of anh. acetonitrile and the rinse added to the reaction mixture, which is then stirred with cooling for an additional 15 minutes. The reaction mixture is then allowed to stand in the dark for 4 days. The liquid is then decanted into 300 ml. of water and 400 ml. of pentane, the organic phase separated, the aqueous phase and precipitate extracted thrice with 100 ml. portions of pentane, which extracts are then combined with the earlier separated organic phase. The combined organic phase is washed thrice with 150 ml. portions of water, dried over anhydrous calcium chloride and concentrated at below room temperature to obtain 1,1,3,3-tetramethyl-1,3-bis-nitratomethyl disiloxane as a non-viscous oil, which explodes on heating or on impact.

EXAMPLE 4

Hexakis-nitratomethyl disiloxane

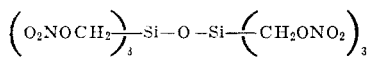

Step A: Hexakis-iodomethyl disilane.

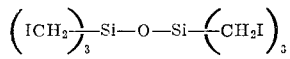

A solution of 1.2 g. of sodium iodide (8 mmoles) and 17 ml. of acetone is prepared. 635.8 mg. of hexakis-bromomethyl disiloxane is added to the solution and the resulting mixture refluxed for 4 hours yielding a suspension which is then concentrated in vacuum to obtain a residue. The residue is completely dissolved in a minimum amount of water and chloroform, the chloroform phase separated, and evaporated to obtain as solids hexakis-iodomethyl disiloxane, M.P. (115°) 121°–125° C., which product is used for Step B, below.

For characterization purposes a sample of hexakis-iodomethyl disiloxane product is further refined by recrystallizing twice from chloroform, M.P. (126°) 127°–127.5° C.

Step B: Hexakis-nitratomethyl disiloxane solution.— A solution of 1.02 g. (6 moles) of silver nitrate and 8 ml. of anhydrous dimethylacetamide is prepared, cooled in a water bath and then mixed with stirring, with 918 mg. (1 mmole) of hexakis-iodomethyl disiloxane (prepared as described in Step A, above). The resulting mixture is stirred in the dark for 3 days. The mixture is then filtered to remove solids (essentially a quantitative amount of silver iodide) yielding a dimethylacetamide solution of hexakis-nitratomethyl disiloxane as filtrate.

The solution of the title product is particularly convenient, as the pure title product detonates on the application of pressure or heat.

Step C: Solid hexakis-nitratomethyl disiloxane.—A highly concentrated (near saturation) solution of silver nitrate in anhydrous acetonitrile is prepared, and a volume of this solution containing 10.2 g. (60 mmoles) of silver nitrate is admixed with 918 mg. (1 mmole) of hexakis-iodomethyl disiloxane and the reaction carried out as described above in Step B. The by-product silver iodide does not separate as in Step B, but remains in solution in the reaction mixture and the hexakis-nitratomethyl disiloxane product separates as a solid. The product is recovered by filtration, and washed in sequence by portions of the highly concentrated silver nitrate-acetonitrile solution, acetonitrile and water. The thus-recovered solid, title product, when dry explodes when pressure is applied with a spatula.

What is claimed is:

1. A compound of the formula

wherein

B is —$CH_2$—$ONO_2$, lower alkyl, or —CH=CH—$R^1$ wherein $R^1$ is a hydrogen atom or lower alkyl;

Y is —$CH_2$—$ONO_2$, lower alkyl, or —CH=CH—$R^2$ wherein $R^2$ is a hydrogen atom or lower alkyl;

Z is lower alkyl or —$CH_2$—$ONO_2$; and

A is —$CH_2$—$ONO_2$ or

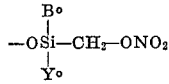

wherein $B^o$ is —$CH_2$—$ONO_2$, lower alkyl, or

—CH=CH—$R_3$ wherein $R^3$ is a hydrogen atom or lower alkyl; and $Y^o$ is —$CH_2$—$ONO_2$, lower alkyl, or

—CH=CH—$R^4$ wherein $R^4$ is a hydrogen atom or lower alkyl.

2. A compound of claim 1 wherein A is —$CH_2$—$ONO_2$.

3. The compound of claim 2 wherein each of B, Y and Z is methyl.

4. The compound of claim 2 wherein Y and Z are both methyl and B is —CH=$CH_2$.

5. A compound of claim 1 wherein A is

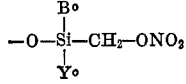

6. The compound of claim 5 wherein each of B, $B^o$, Y and $Y^o$ is methyl, and Z is —$CH_2$—$ONO_2$.

7. The compound of claim 5 wherein each of B, $B^o$, Y, $Y^o$ and Z is —$CH_2$—$ONO_2$.

8. A process which comprises reacting an intermeriate compound of the formula

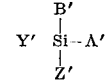

wherein

B' is —$CH_2$—X, lower alkyl, or —CH=CH—$R^1$ wherein $R^1$ is a hydrogen atom or lower alkyl;

Y' is —$CH_2$—X, lower alkyl, or —CH=CH—$R^2$ wherein $R^2$ is a hydrogen atom or lower alkyl;

Z' is lower alkyl or —$CH_2$—X; and

A' is —$CH_2$—X or

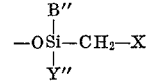

wherein

B" is —$CH_2$—X, lower alkyl, or —CH=CH—$R^3$ wherein $R^3$ is a hydrogen atom or lower alkyl; and Y" is —$CH_2$—X, lower alkyl, or —CH=CH—$R^4$ wherein $R^4$ is a hydrogen atom or lower alkyl; and X, in the above definitions, signifies a halogen atom having an atomic weight of from 35 to 127, with silver nitrate to form a corresponding compound wherein any —X moiety of the intermediate compound is replaced by —$ONO_2$.

9. A process of claim 8 wherein X is iodo.

10. A process according to claim 8 wherein, in the intermediate compound, each of B', Y' and Z' is methyl and A' is —$CH_2$I.

11. The process of claim 8 wherein, in the intermediate compound, each of Y' and Z' is methyl, B' is vinyl and A' is —$CH_2$I.

12. The process of claim 8 wherein, in the intermediate compound, each of X' and Y' is methyl, Z' is $CH_2$I, and A' is —OSi($CH_3$)$_2$$CH_2$I.

13. The process of claim 8 wherein, in the intermediate compound, each of X', Y' and Z' is $CH_2$I, and A' is —OSi($CH_2$I)$_3$.

References Cited

UNITED STATES PATENTS

| | | | |
|---|---|---|---|
| 2,756,246 | 7/1956 | Burkhard | 260—448.2(N) |
| 2,985,680 | 5/1961 | Pepe | 260—448.24UX |
| 3,127,431 | 3/1964 | Fink | 260—448.2X |
| 3,222,319 | 12/1965 | Fink | 260—448.2X |

TOBIAS E. LEVOW, Primary Examiner

P. F. SHAVER, Assistant Examiner

U.S. Cl. X.R.

149—23; 424—184; 260—448.2E, 448.2R